United States Patent [19]
Hunt

[11] 3,828,818
[45] Aug. 13, 1974

[54] FLUID CONTROL VALVES
[75] Inventor: Norman Hunt, Rugby, England
[73] Assignee: Associated Engineering Limited, Leamington Spa, England
[22] Filed: Jan. 8, 1973
[21] Appl. No.: 321,675

[30] Foreign Application Priority Data
  Jan. 14, 1972  Great Britain...................... 1962/72

[52] U.S. Cl.............. 137/625.65, 251/141, 251/139
[51] Int. Cl............................................ F16k 31/06
[58] Field of Search...................... 251/141, 139, 65;
  137/625.65, 625.64

[56]         References Cited
      UNITED STATES PATENTS
2,644,426   7/1953   Moore ............................ 251/65 X
3,443,585   5/1969   Reinicks ......................... 251/141 X
3,628,767   12/1971  Lombard ......................... 251/141 X
3,675,171   7/1972   Kirk.................................. 251/65 X Primary Examiner—Arnold Rosenthal
Attorney, Agent, or Firm—Brisebois & Kruger

[57]              ABSTRACT

A fluid control valve comprises a solenoid for generating an electromagnetic field, a fluid passage and a ferromagnetic ball for controlling fluid flow through the fluid passage. When the solenoid is energized with electricity the ferromagnetic ball is moved from a first position to a second position, in one of which positions the ball closes said fluid passage and in the other position the fluid passage is open.

6 Claims, 5 Drawing Figures

PATENTED AUG 13 1974 3,828,818

FLUID CONTROL VALVES

This invention relates to fluid control valves, and is applicable particularly, but not exclusively, to valves for the control of pressurised liquid in an automatic transmission system for vehicles.

According to the invention, a fluid control valve includes a solenoid arranged, when energized with electricity, to generate a magnetic field which moves a ferromagnetic ball from a first to a second position, in one of which positions the ball closes a fluid passage and in the other position the fluid passage is open.

The invention is described, by way of example only, with reference to the accompanying drawings, in which.

In the drawings the same reference numerals are used to designate the same or similar parts.

Figure 1:
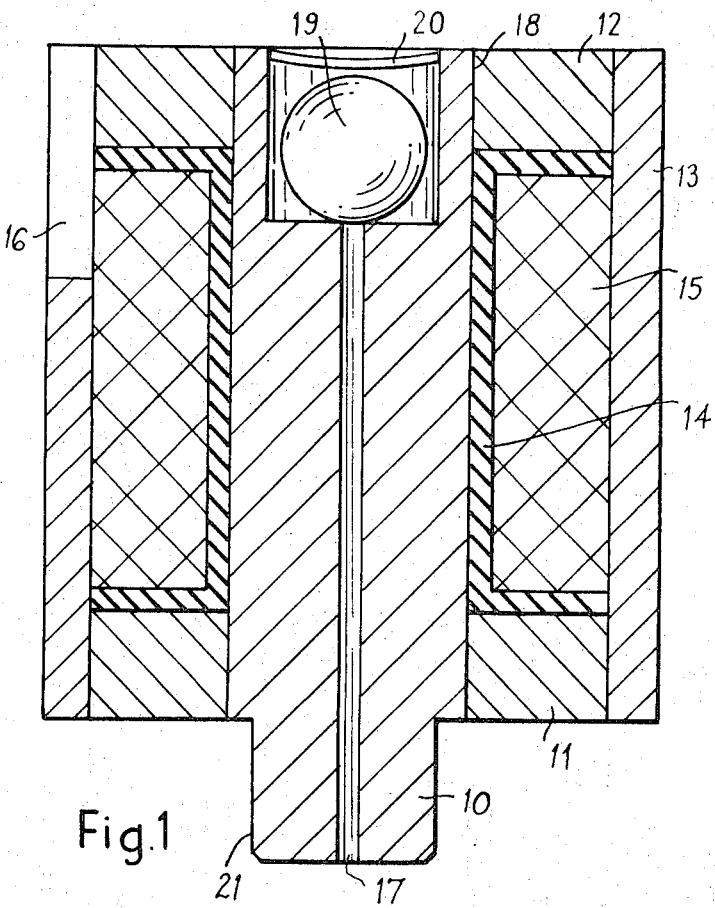
FIG. 1 is a longitudinal section through one embodiment of a solenoid valve.

In FIG. 1, a magnetic circuit consists of a core 10, end plates 11, 12 and an outer sleeve 13, all made of soft iron or mild steel, and closely fitted together. Immediately surrounding the core 10 and between the end plates 11, 12 there is a spool 14 of insulating material on which is wound a coil 15, the wires to which enter through a slot 16 in the sleeve 13.

The core 10 has a narrow co-axial bore 17 throughout its length, terminating in a wider co-axial bore 18 which occupies a substantial portion of the cross-sectional area of the core 10, and extends to the region of the upper end of the winding 15 in the drawing.

A ferromagnetic ball 19, such as a steel ball bearing, is retained in the bore 18 by a cross bar 20 adjacent the mouth of the bore 18. The lower end of the core 10 is provided with a spigot 21, which may be threaded for connection to the supply of fluid of which the flow is to be controlled by the valve. When the coil 15 is not energized, fluid passes upwards through the bore 17 and displaces the ball 19 from the end of the bore 17. The clearance between the ball 19, and the bore 18 and the cross bar 20 is such that the ball 19 provides little restriction to the flow of the fluid, whilst restraining the ball 19 to the region of the upper outlet of the bore 18.

When the coil 15 is energized, due to the position of the bore 18 and the ball 19 in the magnetic circuit, the ball 19 is attracted towards the upper end of the bore 17 and closes it to prevent further flow of the fluid.

It has been found that with a bore 17 of 2 mm. diameter and ball 19 of 6 mm. diameter, the valve will perform satisfactorily with a nominal 12 volt D.C. supply and with 555 turns of 29 S.W.G. wire on the coil 15, at 180 p.s.i.

Figure 1A:
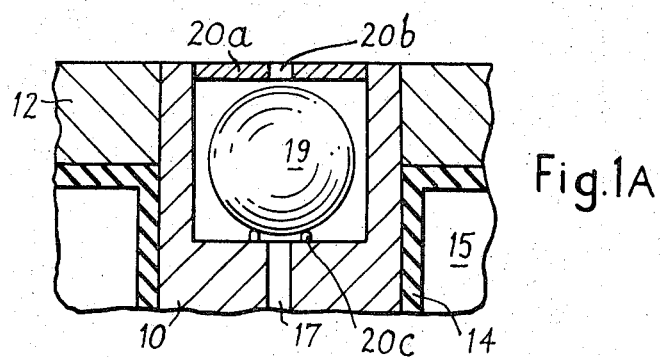
FIG. 1a is a scrap view of a modification of FIG. 1.

Although the valve of FIG. 1 has been described as stopping flow when energized, its function could clearly be reversed as shown in FIG. 1A. In FIG. 1A the upper part of the bore 18 is provided with a closure plate 20a having a central bore 20b corresponding to the bore 17 in place of the cross bar 20, and projections 20c are provided to prevent the ball 19 from closing the upper end of the bore 17. In this design, flow of fluid up the bore 17 would move the ball 19 to close the central bore 20b in the said closure plate 20a, but when the coil 15 were energized the ball 19 would be attracted downwards to allow upward flow of the fluid through the bore 20b.

In one method of using the valve shown in FIG. 1 in an automatic transmission system for a vehicle, pressurised fluid passes through a restrictor to a piston and cylinder type actuator for engaging a clutch or brake. The spigot 21 is connected into the side of the duct between the restrictor and actuator so that when the coil 15 is not energized fluid passing the restrictor will be drained away through the bore 17, thereby limiting the fluid pressure in the actuator to a low value. However, when the coil 15 is energized, the bore 17 is closed and the full fluid pressure is applied to the actuator.

Another use for the valve in an automatic transmission is to control the supply of pressurised fluid to the end of a spool valve which in turn controls the atuomatic transmission.

Figure 2:
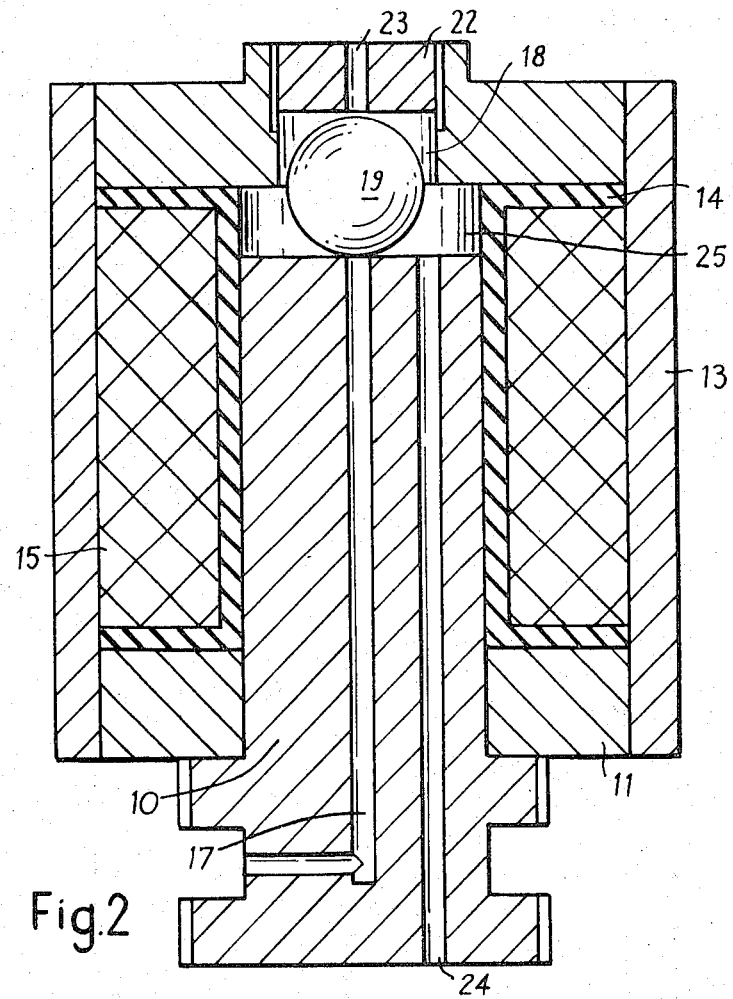
FIG. 2 is a longitudinal section through another embodiment of solenoid valve.

In another embodiment of the invention shown in FIG. 2, the cross bar 20 is omitted and the wider bore 18 is closed at its upper end by a plug 22 having a central vent bore 23 corresponding to the bore 17. When pressurised fluid is supplied through the bore 17 and the coil 15 is not energized, the fluid raises the ball 19 to close off the vent bore 23, and the bore 18 is then pressurised. When the coil 15 is energized, the ball 19 is pulled down to close the bore 17 and open the vent bore 23, so that the bore 18 is vented. A connecting bore 24 leads into the bore 18 for connecting the device being operated to pressurised fluid when the coil 15 is not energized, or to the vent bore 23 when the coil 15 is energized.

If preferred, an annular gap 25 may be provided in the core 10 to assist in diverting the magnetic flux through the ball 19.

Figure 3:
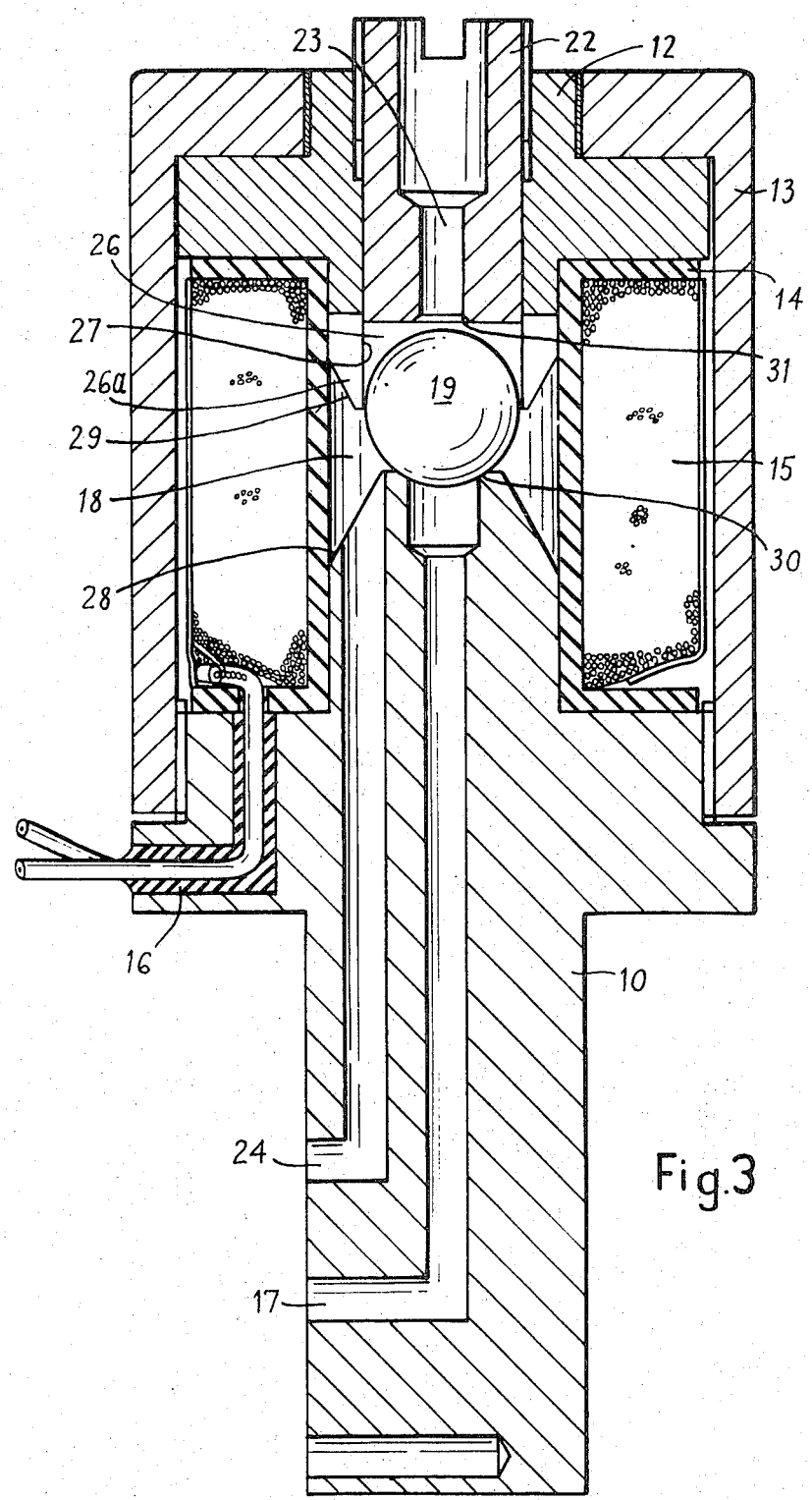
FIG. 3 is a longitudinal section through a further embodiment of solenoid valve.

The further embodiment shown in FIG. 3, differs from that of FIG. 2 in that the bore 18 is completely encircled by the coil 15 with the ball 19 being located between the ends of the spool 14 and coil 15 to improve the magnetic flux conditions. The outer wall of the bore 18 is formed substantially by the spool 14 and an additional core part 26 defines a bore 27 acting as a guide for the ball 19. The bore 27 has a diametral slot 26a formed in the core part 26 to allow the passage of fluid to drain. The cores 10 and 26 have bevelled shoulders 28, 29 projecting into the bore 18 to concentrate further the magnetic flux through the ball 19. Correspondingly shaped seats 30, 31 are provided for the ball 19 on the core 10 and closure plug 22 around the openings of the fluid passages 17, 23.

Figure 4:
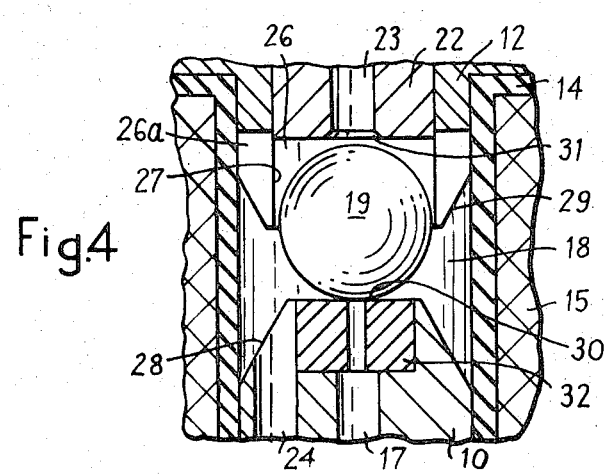
FIG. 4 is a scrap view of a modification of FIG. 3.

The whole of the magnetic flux path constituted by the cores 10 and 26, the end plate 12, the sleeve 13 and ball 19 is made of ferro-nickel, for example, in the amount of 50 percent nickel and 50 percent iron. In the modification shown in FIG. 4 only the ball 19 and a cylindrical insert 32 in the core 10, providing a seat for the ball are made of ferro-nickel. This alloy provides a very low residual force on the ball when the coil is not energized so that the size of the fluid passage openings which the ball has to seal when the coil is energized can be reduced. Thus the ball will seal with a smaller magnetic force when the coil is energized thereby reducing the electrical power required. Otherwise this embodiment operates in a similar manner to that of FIG. 2 with pressure fluid venting occuring through the passage 23 when the coil 15 is energized. When the coil is not energized, the ball closes the passage 23 and pressure fluid passes into the bore 24.

I claim:

1. A fluid control valve defining a fluid chamber which is closed by a member defining a fluid passage, and comprising a ferro-magnetic ball accommodated in said chamber to control fluid flow through said passage, said ball being movable between first and second positions in which the said fluid passage is closed and open respectively, a solenoid for generating a magnetic field to cause the ball to move from its first position to its second position, said solenoid including a central core defining a fluid supply passage and an additional fluid passage leading to said chamber and a coil which is carried by a spool forming an outer wall portion of said chamber and which encircles the core, whereby when the coil is not energised said ball is held in said first position by the flow or pressure of fluid and said additional passage is in communication with said fluid supply passage, and when said coil is energised said ball is held in said second position and said additional fluid passage is cut-off from communication with said fluid supply passage.

2. A fluid control valve defining a fluid chamber which is closed by a member defining a fluid passage, and comprising a ferro-magnetic ball accommodated in said chamber to control fluid flow through said fluid passage, said ball being movable between first and second positions in which the fluid passage is closed and open respectively, a solenoid for generating a magnetic field to cause the ball to move from its first position to its second position, said solenoid incluidng a central core defining a fluid supply passage and an additional fluid passage leading to said chamber and a coil which encircles the core with said ball being positioned axially between the ends of the coil, whereby when the coil is not energized said ball is held in said first position by the flow or pressure of fluid and said additional passage is in communication with said fluid supply passage, and when said coil is energised said ball is held in said second position and said additional fluid passage is cut-off from communication with said fluid supply passage.

3. A valve as set forth in claim 2, wherein the solenoid has an additional core which is disposed adjacent the said fluid passage in said member and which defines a guide bore for said ball.

4. A valve as set forth in claim 3, wherein both said cores have bevelled shoulders which project into said chamber to assist in concentrating the magnetic flux in the vicinity of the ball.

5. A valve as set forth in claim 2, wherein said ball and at least a part of said core are made of ferro-nickel.

6. A valve as set forth in claim 5, wherein the core includes an insert of ferro-nickel providing a seat for said ball.

* * * * *